(12) United States Patent
Loktyukhin et al.

(10) Patent No.: US 10,372,455 B2
(45) Date of Patent: *Aug. 6, 2019

(54) HAND HELD DEVICE TO PERFORM A BIT RANGE ISOLATION INSTRUCTION

(71) Applicant: Intel Corporation, Santa Clara, CA (US)

(72) Inventors: Maxim Loktyukhin, Folsom, CA (US); Eric W Mahurin, Austin, TX (US); Bret L Toll, Hillsboro, OR (US); Martin G Dixon, Portland, OR (US); Sean P Mirkes, Beaverton, OR (US); David L Kreitzer, Bristow, VA (US); Elmoustapha Ould-Ahmed-Vall, Chandler, AZ (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,812

(22) Filed: Dec. 12, 2014

(65) Prior Publication Data

US 2015/0143084 A1 May 21, 2015

Related U.S. Application Data

(63) Continuation of application No. 12/645,307, filed on Dec. 22, 2009, now Pat. No. 9,003,170.

(51) Int. Cl.
*G06F 9/30* (2018.01)
*G06F 9/38* (2018.01)

(52) U.S. Cl.
CPC ...... *G06F 9/30145* (2013.01); *G06F 9/30018* (2013.01); *G06F 9/30029* (2013.01); *G06F 9/30094* (2013.01); *G06F 9/3802* (2013.01)

(58) Field of Classification Search
None
See application file for complete search history.

(56) References Cited

U.S. PATENT DOCUMENTS 3,602,898 A 8/1971 Cogne et al.
3,982,229 A 9/1976 Rouse et al.
(Continued)

FOREIGN PATENT DOCUMENTS

CN 1503936 A 6/2004
EP 0 171 190 A2 2/1986
(Continued)

OTHER PUBLICATIONS

Hyde, Randall, "Bit Manipulation", Chapter Five, The Art of Assembly Language, vol. 4, 2001, 10 pages.
(Continued)

*Primary Examiner* — Corey S Faherty
(74) *Attorney, Agent, or Firm* — Nicholson De Vos Webster & Elliott LLP

(57) ABSTRACT

Receiving an instruction indicating a source operand and a destination operand. Storing a result in the destination operand in response to the instruction. The result operand may have: (1) first range of bits having a first end explicitly specified by the instruction in which each bit is identical in value to a bit of the source operand in a corresponding position; and (2) second range of bits that all have a same value regardless of values of bits of the source operand in corresponding positions. Execution of instruction may complete without moving the first range of the result relative to the bits of identical value in the corresponding positions of the source operand, regardless of the location of the first range of bits in the result. Execution units to execute such instructions, computer systems having processors to execute
(Continued)

such instructions, and machine-readable medium storing such an instruction are also disclosed.

19 Claims, 9 Drawing Sheets

(56) References Cited

U.S. PATENT DOCUMENTS

| | | | |
|---|---|---|---|
| 4,569,016 A * | 2/1986 | Hao | G06F 9/30018 712/224 |
| 4,754,424 A | 6/1988 | Watanabe | |
| 4,785,393 A * | 11/1988 | Chu | G06F 7/57 708/231 |
| 5,129,066 A | 7/1992 | Schmookler | |
| 5,497,493 A | 3/1996 | Colwell et al. | |
| 5,526,296 A * | 6/1996 | Nakahara et al. | 708/209 |
| 5,564,056 A | 10/1996 | Fetterman et al. | |
| 5,598,546 A * | 1/1997 | Blomgren | G06F 9/30174 712/209 |
| 5,651,121 A * | 7/1997 | Davies | 712/200 |
| 5,696,711 A | 12/1997 | Makineni | |
| 5,704,052 A | 12/1997 | Wu et al. | |
| 5,729,725 A | 3/1998 | Kato et al. | |
| 5,930,492 A | 7/1999 | Lynch | |
| 5,995,122 A * | 11/1999 | Hsieh | H03M 7/24 345/505 |
| 6,052,522 A * | 4/2000 | Mattela | G06F 5/01 703/13 |
| 6,128,725 A | 10/2000 | Leach | |
| 6,272,620 B1 | 8/2001 | Kawasaki et al. | |
| 6,356,951 B1 * | 3/2002 | Gentry, Jr. | H04L 69/161 709/217 |
| 6,480,868 B2 * | 11/2002 | Abdallah | G06F 9/30014 708/204 |
| 6,502,115 B2 * | 12/2002 | Abdallah | H03M 7/24 708/204 |
| 6,754,687 B1 * | 6/2004 | Kurak, Jr. | G06F 9/30032 707/999.01 |
| 6,757,771 B2 * | 6/2004 | Christie | G06F 9/30036 710/260 |
| 6,801,625 B1 | 10/2004 | Dealy | |
| 6,807,622 B1 * | 10/2004 | McGrath | G06F 9/30101 712/210 |
| 6,877,084 B1 * | 4/2005 | Christie | G06F 9/30036 711/125 |
| 6,889,312 B1 * | 5/2005 | McGrath | G06F 9/30025 712/210 |
| 7,095,897 B2 | 8/2006 | Golla et al. | |
| 7,133,040 B1 | 11/2006 | Abdallah et al. | |
| 7,284,115 B2 * | 10/2007 | McGrath | G06F 9/30101 712/210 |
| 7,315,937 B2 | 1/2008 | Jones et al. | |
| 7,321,916 B2 | 1/2008 | Harrison et al. | |
| 7,353,371 B2 | 4/2008 | Gee et al. | |
| 7,529,924 B2 | 5/2009 | Sydir et al. | |
| 7,558,724 B2 * | 7/2009 | Rostampour | G06F 9/45537 703/26 |
| 8,874,882 B1 * | 10/2014 | Ronen | G06F 9/3001 712/221 |
| 2002/0188830 A1 | 12/2002 | Boles et al. | |
| 2004/0078549 A1 | 4/2004 | Tanaka et al. | |
| 2006/0259737 A1 | 11/2006 | Sachs et al. | |
| 2008/0022078 A1 * | 1/2008 | Taunton | G06F 9/30018 712/223 |
| 2008/0077773 A1 | 3/2008 | Julier et al. | |
| 2008/0229116 A1 * | 9/2008 | Dixon | H04L 9/28 713/190 |
| 2008/0240426 A1 * | 10/2008 | Gueron | G06F 12/0875 380/44 |
| 2009/0006822 A1 | 1/2009 | Ginzburg et al. | |
| 2011/0138122 A1 * | 6/2011 | Hughes | G06F 12/0802 711/117 |
| 2013/0275482 A1 * | 10/2013 | Abraham | G06F 17/10 708/200 |
| 2013/0290672 A1 * | 10/2013 | Ould-Ahmed-Vall | G06F 9/30032 712/7 |

FOREIGN PATENT DOCUMENTS

| | | |
|---|---|---|
| EP | 0 180 157 A2 | 5/1986 |
| EP | 0 525 375 A2 | 2/1993 |
| JP | S51-2771 A | 1/1976 |
| JP | 61-103241 A | 5/1986 |
| JP | S61-88338 A | 5/1986 |
| JP | S6491228 A | 4/1989 |
| JP | 02-299082 A | 12/1990 |
| JP | 05-100854 A | 4/1993 |
| JP | 5-150942 A | 6/1993 |
| JP | H06131178 A | 5/1994 |
| JP | 6-222918 A | 8/1994 |
| JP | H11-96000 A | 4/1999 |
| JP | 2004-013185 A | 1/2004 |
| JP | 2006-127460 A | 5/2006 |
| JP | 2010-255319 A | 11/2010 |
| JP | 2011-134304 A | 7/2011 |
| JP | 05-456643 B2 | 4/2014 |
| JP | 2014-81953 A | 5/2014 |
| JP | 2016-26365 A | 2/2016 |

OTHER PUBLICATIONS

Fog, Agner, "Software Optimization Resources", 2009, pp. 1-5. Retrieved from: http://www.agner.org/optimize.
Bader, William, "VAX-11 Architecture Reference Manual", part No. EK-VAXAR-RM-001, Revision 6.1, May 20, 1982, 16 pages.
Office Action received for German Patent Application No. 10 2010 053 967.8, dated Apr. 1, 2014, 12 pages of English Translation and 13 pages of German Office Action.
Non Final Office Action Received for the U.S. Appl. No. 12/645,307, dated Dec. 26, 2012, 9 pages.
Notice of Allowance received for U.S. Appl. No. 12/645,307, dated Nov. 24, 2014, 7 Pages.
Notice of Allowance received for U.S. Appl. No. 12/645,307, dated Apr. 11, 2013, 8 pages.
Notice of Allowance received for Japanese Patent Application No. 2010-255319, dated Dec. 10, 2013, 1 page of Japanese NOA only.
Office Action received for Japanese Patent Application No. 2010-255319, dated Feb. 26, 2013, 3 page of English Translation and 3 pages of Japanese Office Action.
Office Action received for Japanese Patent Application No. 2010-255319, dated Aug. 27, 2013, 1 page of English Translation and 1 page of Japanese Office Action.
Office Action received for Chinese Patent Application No. 201010620155.7, dated Sep. 12, 2014, 6 pages of English Translation and 4 pages of Chinese Office Action.
Office Action received for Chinese Patent Application No. 201010620155.7, dated Feb. 4, 2013, 10 page of English Translation and 7 pages of Chinese Office Action.
Office Action received for Chinese Patent Application No. 201010620155.7, dated Dec. 5, 2013, 7 page of English Translation and 6 pages of Chinese Office Action.
Office Action received for Chinese Patent Application No. 201010620155.7, dated May 5, 2014, 9 page of English Translation and 6 pages of Chinese Office Action.
Office Action received for Japanese Patent Application No. 2014-001946, dated Dec. 9, 2014, 16 pages of English Translation and 14 pages of Japanese Office Action.
Cavium Networks, "Nitrox II", 2000-2009, 1 page.
Fog, Agner, "Optimization Manual: 4. Instruction Tables", Software Optimization Resources, Lists of instruction latencies, throughputs and micro-operation breakdowns for Intel, AMD and VIA CPUs, 1996-2009, pp. 1-154.

(56) References Cited

OTHER PUBLICATIONS

Henry, G. G., "The VIA Isaiah Architecture", Centaur Technology. Inc., Jan. 2008, pp. 1-12.
Hilewitz, etal., "Performing Advanced Bit Manipulations Efficiently in General-Purpose Processors", 18th IEEE Symposium on Computer Arithmetic, IEEE Computer Society, 10 pages.
Intel, "Intel 64 and IA-32 Architectures Software Developer's Manual vol. 2A: Instruction Set Reference, A-M", Order No. 253666-032US, Sep. 2009, 5 pages.
Intel, "Intel Itanium Architecture Software Developer's Manual", vol. 3: Instruction Set Reference, Revision 2.2, Doc. No. 245319-005, Jan. 2006, 6 pages.
SPARC International. Inc., "The SPARC Architecture Manual", Version 8, 1991-1992, 50 pages.
VIA Technologies Inc., "VIA Nano Processor", 2008, 3 pages.
Warren, Jr., Henrys, "Hacker's Delight", Addison-Wesley, 2003, 65 pages.
Wikipedia, "UltraSPARC Cryptographic Performance", UltraSPARC cryptographic accelerators—Wikipedia, Jul. 8, 2008, pp. 1-5.
Office Action received for Taiwan Patent Application No. 099139490, dated Jan. 26, 2015, 8 pages of Taiwan Office Action and 1 pages of English search report.
Non-Final Office Action received for the U.S. Appl. No. 14/568,725, dated Mar. 4, 2015, 10 pages.
Non-Final Office Action received for the U.S. Appl. No. 14/568,754, dated Mar. 4, 2015, 11 pages.
Notice of Allowance received for Taiwan Patent Application No. 099139490, dated Jun. 9, 2015, 2 pages of Official copy only.
Notice of Allowance received for Chinese Patent Application No. 201010620155.7, dated Mar. 11, 2015, 6 pages (2 pages of English Translation and 4 pages of Chinese Notice of Allowance).
Office Action received for Chinese Patent Application No. 201410674064.X, dated Aug. 15, 2016, 11 pages of Official copy only.
Non Final Office Action received for U.S. Appl. No. 14/568,725, dated Feb. 7, 2017, 10 pages.
Non Final Office Action received for U.S. Appl. No. 14/568,754, dated Feb. 7, 2017, 10 pages.
Final Office Action received for U.S. Appl. No. 14/568,725, dated Sep. 10, 2015, 10 pages.
Final Office Action received for U.S. Appl. No. 14/568,754, dated Sep. 10, 2015, 10 pages.
Yamaguchi, Tetsuhiro, "Part 1: Power of x64, Generation of formalized 64-bit Windows with x64", Nikkei WindowsPro, Nikkei BP Company, No. 94, Jan. 2005, 23 pages.
Office Action received for Japanese Patent Application No. 2015-219702, dated Nov. 22, 2016, 30 pages of Japanese Office Action including 17 pages of English Translation.
Office action received for Japanese Patent Application No. 2014-001946, dated Dec. 27, 2016, 2 pages of Japanese Office Action including 1 page of English Translation.
Office Action received for Chinese Patent Application No. 201410674064.X, dated Aug. 15, 2016, 23 pages of Chinese Office Action including 12 pages of English Translation.
ARM, "ARM Architecture Reference Manual", ARM v7-A and ARM v7-R edition, Copyright © 1996-1998, 2000, 2004-2008, pp. i-xii, A2-5-A2-7, A4-14, A5-24, A6-11, A6-33, A8-308, A8-309, A8-466, A8-467, A8-514-A8-525, Appxl-13, Appxl-14, AppxJ-17.
Intel, "Intel 64 and IA-32 Architectures Software Developer's Manual", vol. 1: Basic Architecture, Order No. 253665-032US, Sep. 2009, 500 pages.
Office Action received for Chinese Patent Application No. 201410674064.X, dated Jun. 5, 2017, 22 pages of Chinese Office Action including 05 pages of English Translation.
Advanced Micro Devices, "Software Optimization Guide for AMD Family 10h and 12h Processors", Publication 40546, Revision 3.13, Feb. 2011, pp. 1-5.
Decision to Grant a patent from foreign counterpart Japanese Patent Application No. 2015-219702, dated May 22, 2018, 5 pages.
Intel Corporation, "Intel® 64 and IA-32 Architectures Software Developer's Manual," System Programming Guide, Part 2, vol. 3B, Oct. 2011, 670 pages.
Notice of Allowance from U.S. Appl. No. 15/921,134, dated Oct. 1, 2018, 8 pages.
Office action from foreign counterpart Japanese Patent Application No. 2014-001946, dated Jul. 7, 2015, 2 pages.
Final Office Action received for the U.S. Appl. No. 14/568,725, dated Oct. 10, 2017, 10 pages.
Final Office Action received for the U.S. Appl. No. 14/568,754, dated Oct. 10, 2017, 11 pages.
Office Action received for Japanese Patent Application No. 2015-219702, dated Oct. 31, 2017, 12 pages of Japanese Office Action including 7 pages of English Translation.
Intel, "Intel Itanium Architecture Software Developer's Manual", vol. 3: Instruction Set Reference, Revision 2.1, Document No. 245319-004, Oct. 2002, 958 pages.
Office Action received for Chinese Patent Application No. 201410674064.X, dated Jan. 2, 2018, 43 pages of Chinese Office Action including 28 pages of English Translation.
Office Action received for Indian Patent Application No. 2829/DEL/2010, dated Nov. 8, 2017, 6 pages.
Notice of Reasons for Refusal from foreign counterpart Japan Application No. 2018-138039, dated May 21, 2019, 11 pages.

\* cited by examiner

| INSTRUCTION | DESCRIPTION |
|---|---|
| BZHI - ZERO HIGH BITS STARTING WITH SPECIFIED BIT POSITION | BZHI COPIES BITS OF SECOND OPERAND INTO DESTINATION AND SETS TO ZERO ALL HIGHER BITS STARTING WITH BIT POSITION SPECIFIED BY NUMBER CONTAINED IN EIGHT LOWER BITS OF FIRST OPERAND UP TO MAXIMUM OF OPERAND SIZE. CARRY FLAG IS SET IF NUMBER CONTAINED IN EIGHT LOW BITS OF FIRST OPERAND IS GREATER THAN OPERAND SIZE. DEFAULT OPERAND SIZE IS 32-BITS. 64-BIT OPERAND SIZE IS ENCODABLE. PREFIX BYTE OF 66H BEFORE INSTRUCTION WILL CAUSE #UD. |

*FIG. 6*

```
N <- DEST[7:0]
DEST <- SRC
IF (N < OperandSize)
    DEST[OperandSize-1:N] <- 0
FI
IF (N > OperandSize)
    CF <- 1
ELSE
    CF <- 0
FI
```

| | 31 | | 0 | |
|---|---|---|---|---|
| | | AX | | EAX |
| | | BX | | EBX |
| | | CX | | ECX |
| | | DX | | EDX |
| | | ESI | | |
| | | EDI | | |
| | | EBP | | |
| | | ESP | | |

| 63 | 31 | 0 | |
|---|---|---|---|
| | | EAX | RAX |
| | | EBX | RBX |
| | | ECX | RCX |
| | | EDX | RDX |
| | | ESI | RSI |
| | | EDI | RDI |
| | | EBP | RBP |
| | | ESP | RSP |
| | | | R8 |
| | | | R9 |
| | | | R10 |
| | | | R11 |
| | | | R12 |
| | | | R13 |
| | | | R14 |
| | | | R15 |

HAND HELD DEVICE TO PERFORM A BIT RANGE ISOLATION INSTRUCTION

The present application is a continuation of U.S. patent application Ser. No. 12/645,307, filed Dec. 22, 2009, entitled "BIT RANGE ISOLATION INSTRUCTIONS, METHODS, AND APPARATUS." U.S. patent application Ser. No. 12/645,307 is hereby incorporated herein by reference.

BACKGROUND

Field

Various different embodiments relate to bit manipulation instructions, methods of executing the bit manipulation instructions, execution units to execute the bit manipulation instructions, or devices incorporating such execution units. In particular, various different embodiments relate to bit range isolation instructions to isolate a range of bits, methods of executing the bit range isolation instructions, execution units to execute the bit range isolation instructions, or devices incorporating such execution units.

Background Information

General-purpose processors, special-purpose processors, controllers, and other devices execute instructions as specified by an instruction set architecture (ISA). The instructions allow the devices to perform a wide variety of different types of operations. One common type of operation is a bit manipulation operation.

Various different bit manipulation instructions are known. One known bit manipulation instruction is the EXTR—Extract instruction. The EXTR instruction is described in the Intel® Itanium® Architecture Software Developer's Manual, Volume 3: Instruction Set Reference, Revision 2.2, January 2006, Document Number: 245319-005.

The EXTR instruction extracts a bit field specified by two immediate values, and right shifts the extracted bit field in order to right justify the extracted bit field in the destination. Such shifting of the extracted bit field in addition to extraction of the bit field in a single instruction may tend to limit the speed and/or efficiency of certain data processing operations. Other bit manipulation instructions rely on a table lookup, which tends to have long latency.

Due to the importance of quickly and/or efficiently processing data, new and different data manipulation instructions would be useful.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 6 shows a description of a BZHI—Zero High Bits Starting with Specified Bit Position instruction representing a particular example embodiment of a bit range isolation instruction.

FIG. 7 shows operation in pseudocode of a BZHI—Zero High Bits Starting with Specified Bit Position instruction representing a particular example embodiment of a bit range isolation instruction.

FIG. 9 illustrates one particular example embodiment of a suitable 32-bit general-purpose register set.

FIG. 10 illustrates another particular example embodiment of a suitable 64-bit general-purpose register set.

DETAILED DESCRIPTION

In the following description, numerous specific details, such as processor types, instruction implementation specifics, data types, register types, register arrangements, system configurations, and the like, are set forth. However, it is understood that embodiments may be practiced without these specific details. In other instances, well-known circuits, structures and techniques have not been shown in detail in order not to obscure the understanding of this description.

There are varied situations in which the bits stored in the register or other storage location may include a string or range of bits of interest, along with one or more other strings or ranges of bits that are not presently of interest or at least are not part of the range of bits of interest. Representatively, the range of bits of interest may represent a number or value upon which further processing is to be performed. The bits that are not presently of interest may be regarded as unwanted bits or don't care bits. In one or more embodiments, the range of bits of interest may be isolated by zeroing or otherwise discarding the unwanted bits while preserving the values of the bits in the range of bits of interest. This may help to facilitate further processing of the range of bits of interest.

Embodiments pertain to new and useful bit range isolation instructions. Other embodiments pertain execution units to execute the bit range isolation instructions. Still other embodiments pertain to general-purpose processors, special-purpose processors, controllers, or other logic devices or instruction processing apparatus having such execution units or capable of executing such instructions. Further embodiments pertain to bit range isolation instructions stored on a disc, memory, or other tangible machine-readable medium.

Figure 1:
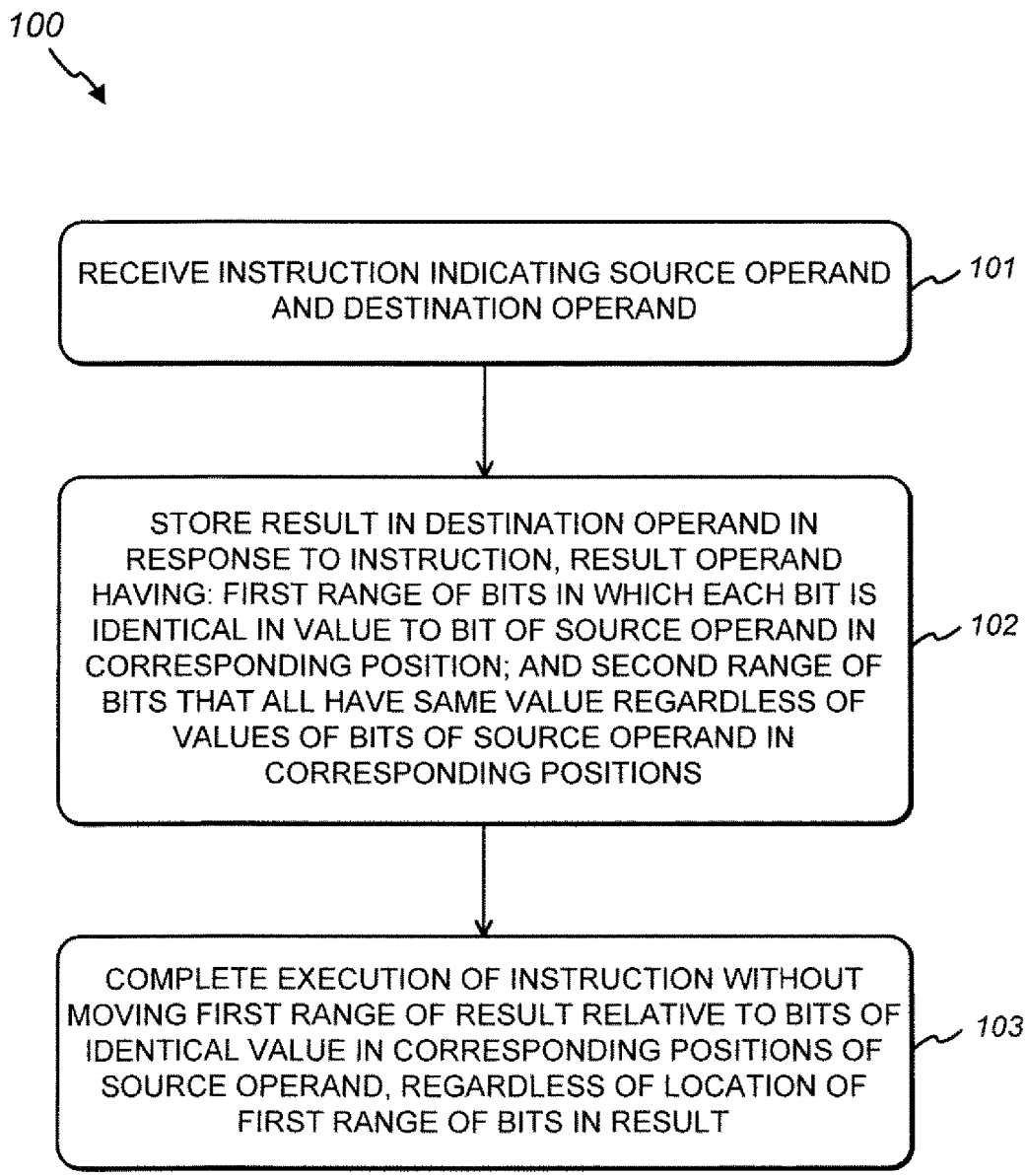
FIG. 1 is a block flow diagram of an embodiment of a method of processing an embodiment of a bit range isolation instruction.

FIG. 1 is a block flow diagram of an embodiment of a method 100 of processing an embodiment of a bit range isolation instruction. In various embodiments, the method may be performed during use by a general-purpose processor, a special-purpose processor (e.g., a graphics processor or a digital signal processor), a hardware accelerator (e.g., a cryptographic accelerator), or another type of logic device or instruction processing apparatus.

The bit range isolation instruction may be received at the processor or other apparatus, at block 101. In one or more embodiments, the bit range isolation instruction may indicate a source operand and a destination operand.

A result may be stored in the destination operand in response to the bit range isolation instruction, at block 102. The result operand may have a first range of bits and a second range of bits. The first range of bits may be such that each bit is identical in value to a bit of the source operand in a corresponding position. The second range of bits may all have a same value, regardless of values of bits of the source operand in corresponding positions. In one or more embodiments, all of the bits of the second range may be zeros. Alternatively, all of the bits of the second range may be ones.

Execution of the bit range isolation instruction may complete without shifting or otherwise moving the first range of the result relative to the bits of identical value in the corresponding positions of the source operand, at block 103. This may be true regardless of the location of the first range of bits in the result (e.g., even if the first range of bits is an intermediate range of bits within the result). In one or more embodiments, execution of the bit range isolation instruction may not involve a table lookup, which tends to have long latency.

There are several possible advantages of omitting such a shift or bit movement operation from the bit range isolation instruction. For one thing, the shift operation is not always needed. Moreover the shift operation may tend to increase the time for instruction execution and/or may tend to increase the logic area/cost. Further, many ISAs already have a dedicated shift operation that may be used separately from the bit range isolation instruction. Other advantages will be discussed further below.

Figure 2:
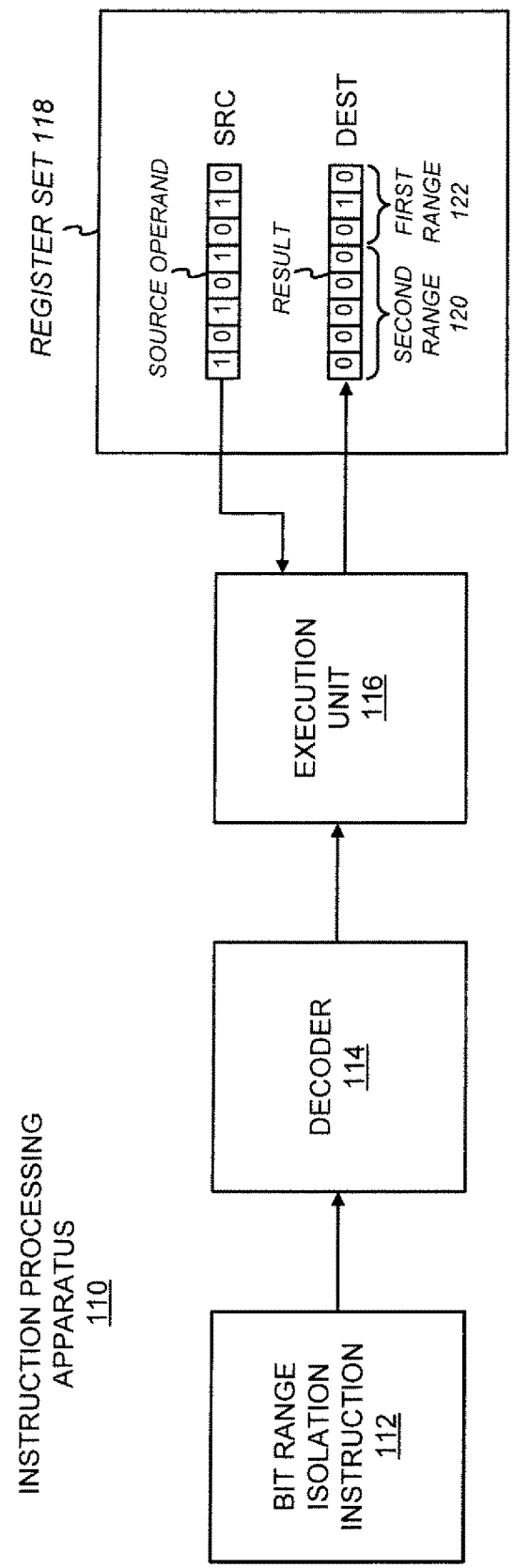
FIG. 2 is a block diagram of an example embodiment of an instruction processing apparatus.

FIG. 2 is a block diagram of an example embodiment of an instruction processing apparatus 110. In one or more embodiments, the instruction processing apparatus may be a general-purpose processor. The processor may be any of various complex instruction set computing (CISC) processors, various reduced instruction set computing (RISC) processors, various very long instruction word (VLIW) processors, various hybrids thereof, or other types of processors entirely. In one or more embodiments, the processor may be a general-purpose processor of the type manufactured by Intel Corporation, of Santa Clara, Calif., although this is not required. Specific examples of general-purpose processors available from Intel Corporation include, but are not limited to, Intel® Core™ i7 processor Extreme Edition, Intel® Core™ i7 processor, Intel® Core™ i5 processor, Intel® Core™2 Extreme processor, Intel® Core™2 Quad processor, Intel® Core™2 Duo processor, Intel® Pentium® processor, and Intel® Celeron® processor.

Alternatively, the instruction processing apparatus may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors entirely.

In still other embodiments, the instruction processing apparatus may be a controller (e.g., a microcontroller), or other type of logic circuit capable of processing instructions.

Referring again to FIG. 2, during use the instruction processing apparatus may receive an embodiment of a bit range isolation instruction 112. By way of example, the bit range isolation instruction may be received from a memory or from software. The bit range isolation instruction may represent a machine instruction or control signal that is recognized by the instruction processing apparatus. The bit range isolation instruction may include an opcode or other instruction identifier. The instruction processing apparatus may have specific or particular circuitry or other logic (e.g., software combined with hardware and/or firmware) that is operable to store a result in response to and/or as specified by the bit range isolation instruction.

The illustrated embodiment of the instruction processing apparatus includes an instruction decoder 114. The decoder may receive and decode the bit range isolation instruction. The decoder may generate and output one or more micro-operations, micro-code entry points, microinstructions, other instructions, or other control signals, which reflect, or are derived from, the original bit range isolation instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder is not a required component of the apparatus. In one or more other embodiments, the apparatus may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Referring again to FIG. 2, the instruction processing apparatus includes an execution unit 116. By way of example, the execution unit may include an arithmetic logic unit, a logical unit, a bit manipulation capable functional unit, or the like.

In the illustrated embodiment, the execution unit is coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit.

As a result of the decoder decoding the bit range isolation instruction, the execution unit may receive one or more micro-operations, micro-code entry points, microinstructions, other instructions, or other control signals, which reflect, or are derived from, the bit range isolation instruction. Alternatively, the execution unit may receive and execute instructions or control signals from the aforementioned instruction conversion logic. The execution unit may include circuitry or other execution logic (e.g., some combination of hardware, software, and/or firmware) operable to execute the instructions or other control signals derived from the bit range isolation instruction.

The execution unit may be operable, as a result of the bit range isolation instruction, to store a result at a destination operand indicated by the bit range isolation instruction. The result may have a first range of bits and a second range of bits. In one or more embodiments, in the first range of bits each bit may be identical in value to a bit in a source operand indicated by the instruction in a corresponding position. In the second range of bits all of the bits may have a same value, regardless of values of bits of the source operand in corresponding positions. In one or more embodiments, the execution unit may complete execution of the bit range isolation instruction without moving the first range of the result relative to the bits of identical value in the corresponding positions of the source operand, regardless of the location of the first range of bits in the result (e.g., even if the first range of bits is an intermediate range of bits within the result). Avoiding such shifting or moving of the first range of bits during execution of the bit range isolation instruction may help to increase the speed and/or efficiency of certain data processing operations.

The bit range isolation instruction may implicitly identify or explicitly specify at least one source operand and a destination operand. In one or more embodiments, the bit range isolation instruction may have a dedicated field or set of bits to explicitly specify the source operand, the destination operand, or both. In one or more embodiments, the bit range isolation instruction may implicitly or impliedly identify one or more fixed registers or other storage locations for the source operand, the destination operand, or both. In one or more embodiments, a storage location used for the source operand may also optionally be used for the destination operand such that the result may overwrite the source data.

In one or more embodiments, some or all of the source and destination operands may be stored in registers of a register set 118. The register set may be part of a register file, along with potentially other registers, such as control registers, status registers, flag registers, etc. The registers may be storage locations or devices that may be used to store data. The register set may often be physically located on die with the execution unit. The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory (not shown in this figure).

Referring again to FIG. 2, an example embodiment of a bit range isolation operation is shown. The bit range isolation instruction indicates or specifies a source operand (SRC), in this particular case in one or more registers of the register set. To simplify the drawing, the illustrated source operand (SRC) is shown as having only eight bits, namely "10101010," although often the operand may have more bits, such as 16 bits, 32 bits, 64 bits, 128 bits, or some other number of bits.

The execution unit may receive the source operand (SRC). The execution unit may be enabled as a result of the bit range isolation instruction to perform a bit range isolation operation on the source operand (SRC), and to store a corresponding result in a destination operand (DEST) indicated or specified by the instruction. In this particular case, the destination operand is stored in one or more registers of the register set.

The result has a first range of bits 122 and a second range of bits 120. In this particular example, the first range of bits 122 is the three least significant (rightmost) bits, and the second range of bits 120 is the five most significant (leftmost) bits, although this is only an example.

In the first range of bits 122 each bit is identical in value to a bit in the source operand (SRC) in a corresponding position. The three least significant or rightmost bits of the source operand (SRC) have the bit values "010," and likewise the three least significant or rightmost bits of the first range of bits in the destination operand (DEST) also have the same identical bit values "010."

In the second range of bits 120 all of the bits have a same value, in this particular case all zero, regardless of values of bits of the source operand in corresponding positions. The five most significant bits of the result in the destination operand (DEST) have the bit values "00000," even though the five most significant or leftmost bits of the source operand (SRC) have the bit values "10101." In an alternate embodiment, all of the bits of the second range may all have the same value of one, namely "11111". Notice that in this particular case three bits in the second range of bits each have a different value than a bit of the source operand in a corresponding position.

To avoid obscuring the description, a relatively simple instruction processing apparatus has been shown and described. It is to be appreciated that other embodiments may have a plurality of execution units. For example, the apparatus may include multiple different types of execution units, such as, for example, arithmetic units, arithmetic logic units (ALUs), integer units, etc. At least one of these units may be responsive to an embodiment of bit range isolation instruction as disclosed herein. Still other embodiments may have multiple cores, logical processors, or execution engines. An execution unit operable to execute a bit range isolation instruction as disclosed herein may be included within at least one, at least two, most, or all of the cores, logical processors, or execution engines.

The instruction processing apparatus may also optionally include one or more other well-known components. For example, other embodiments may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

In one or more embodiments, an embodiment of a bit range isolation instruction may implicitly or impliedly indicate a first end of a range of bits of interest to be isolated. The implicitly or impliedly indicated end may be 'understood' although 'unexpressed' through an explicit value. The processor or other instruction processing apparatus may recognize the bit range zeroing instruction through an opcode, or other unique instruction identifier, and understand that an end of a range of bits is inherent.

Figure 3:
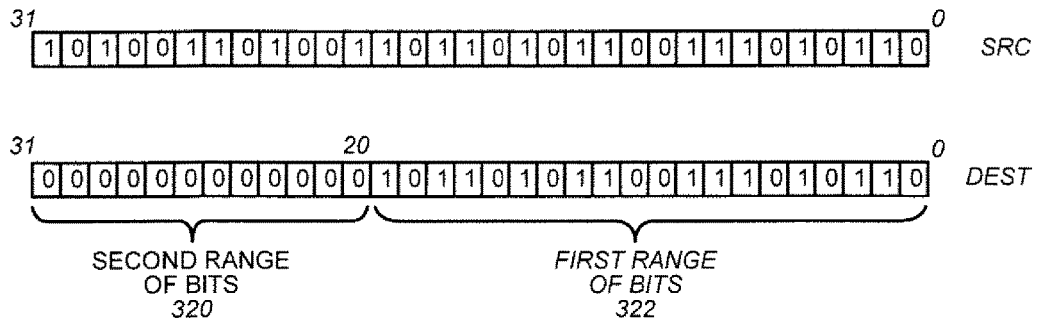
FIG. 3 illustrates a first example embodiment of a bit range isolation operation according to a first example embodiment of a bit range isolation instruction.

FIG. 3 illustrates a first example embodiment of a bit range isolation operation according to a first example embodiment of a bit range isolation instruction that implicitly or impliedly indicates a first end of a range of bits of interest as a least significant bit (LSB). In the illustration, the least significant bit is the rightmost bit labeled "0".

The bit range isolation instruction may implicitly indicate or explicitly specify a source operand (SRC). In the illustrated embodiment, the source operand has 32-bits. Alternatively, the operand may have 16-bits, 64-bits, 128-bits, or some other number of bits. The particular illustrated 32-bit source operand (SRC) stores the following bits from left to right: "10100110100110110101100111010110." These particular bit values are for illustration purposes only, and are not required.

The bit range isolation instruction may also implicitly indicate or explicitly specify a destination operand (DEST). The destination operand (DEST) has a result representing an example embodiment of a bit range isolation operation performed on the source operand (SRC) according to the bit range isolation instruction. The result has a first range of bits 322 of interest and a second range of cleared or discarded bits 320.

The first range of bits 322 has a start at the implicit LSB first end and has an end, in this particular case, at the nineteenth bit. The second range of bits, in this particular case, starts at the twentieth bit and ends at the most significant bit (MSB). The boundary between the first and second ranges may alternatively be at any other location.

In one or more embodiments, the bit range isolation instruction may also explicitly specify, such as through a source operand or a constant or immediate associated with the instruction, a value (e.g., a number of bits representing a number) that indicates the end of the first range of bits of interest. For example, the explicit value may represent a position of a bit corresponding to the end as measured from an implicit, explicit, or otherwise understood point (for example the implicit least significant bit end, the most significant bit, or the center bit). As another example, the value may represent a positive or negative length in bits from an implicit, explicit, or otherwise understood point (for example the implicit least significant bit end, a most significant bit, a center bit, or a start of the range of bits of interest).

In the first range of bits 322 each bit is identical in value to a bit of the source operand in a corresponding position. In this particular example, the nineteen least significant or rightmost bits of the source operand (SRC) have the bit values "1011010110011101010110," and likewise the nineteen least significant or rightmost bits of the first range of bits 322 in the destination operand (DEST) also have the bit values "1011010110011101010110."

In the second range of bits 320 all of the bits have the same value, which in this particular case is zero. In this particular example, the twelve most significant or leftmost bits of the source operand (SRC) have the bit values "101001101001," whereas the twelve most significant bits of the second range of bits in the destination operand (DEST) all have the bit values "000000000000". Alternatively, all of the bits of the second range may have the same value of one (e.g., 111111111111).

It is to be appreciated that the bit indicated by the instruction may either be included in the first range of bits to be preserved or in the second range of bits to be zeroed or otherwise discarded. Either convention may be adopted by the instruction.

As another option, in one or more embodiments, the bit range isolation instruction may implicitly or impliedly indicate the first end of a range of bits of interest to be isolated as a most significant bit (MSB). In the illustrations, the most significant bit is the leftmost bit.

Figure 4:
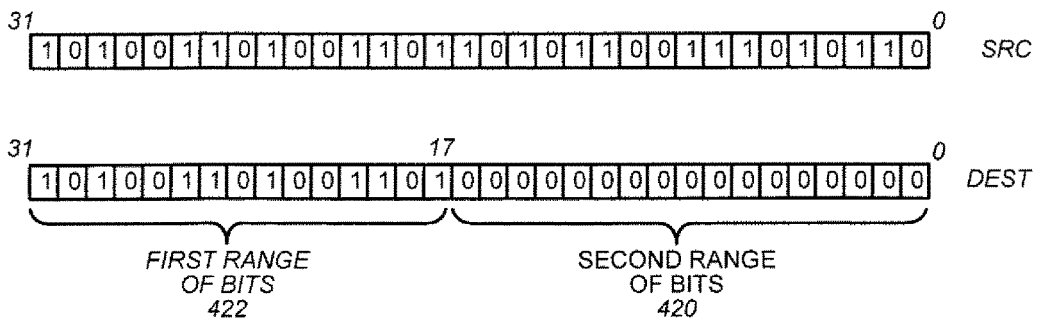
FIG. 4 illustrates a second example embodiment of a bit range isolation operation according to a second example embodiment of a bit range isolation instruction.

FIG. 4 illustrates a second example embodiment of a bit range isolation operation according to a second example embodiment of a bit range isolation instruction that implicitly or impliedly indicates an end of a range of bits of interest as a most significant bit (MSB). In the illustration, the most significant bit (MSB) is the leftmost bit labeled "31."

The second example embodiment has certain similarities with respect to the first example embodiment described immediately above. For brevity, the discussion will tend to focus on the differences without repeating the similarities.

As before, the bit range isolation instruction may indicate or specify a source operand (SRC) and a destination operand (DEST). The destination operand (DEST) has a result including a first range of bits of interest 422 and a second range of bits 420 zeroed or otherwise discarded.

The first range of bits 322 has an end at the implicit MSB and has a start, in this particular case, at the seventeenth bit. The second range of bits starts at the least significant bit (LSB) and ends, in this particular case, at the sixteenth bit. The boundary between the first and second ranges may alternatively be at any other location.

In one or more embodiments, the bit range isolation instruction may implicitly indicate or explicitly specify, such as through a second source operand or an immediate of the instruction, a value that indicates the start of the first range of bits. By way of example, the value may represent a position of a bit corresponding to the second end or a length in bits in which an end of the length corresponds to the second end.

In the first range of bits 422 each bit is identical in value to a bit of the source operand in a corresponding position. In this particular example, the fifteen most significant or leftmost bits of the source operand (SRC) have the bit values "101001101001101," and likewise the fifteen most significant or leftmost bits of the first range of bits 422 in the destination operand (DEST) also have the bit values "101001101001101."

In the second range of bits 420 all of the bits have the same value, which in this particular case is zero. In this particular example, the sixteen least significant or rightmost bits of the source operand (SRC) have the bit values "10101100111010110," whereas the sixteen least significant bits of the second range of bits in the destination operand (DEST) all have the bit values "0000000000000000". Alternatively, all of the bits of the second range may have the same value of one (e.g., 1111111111111111).

As yet another option, in one or more embodiments, the bit range isolation instruction may explicitly specify, such as through a second source operand and/or an immediate of the instruction, values that indicate both ends of a range of bits of interest.

Figure 5:
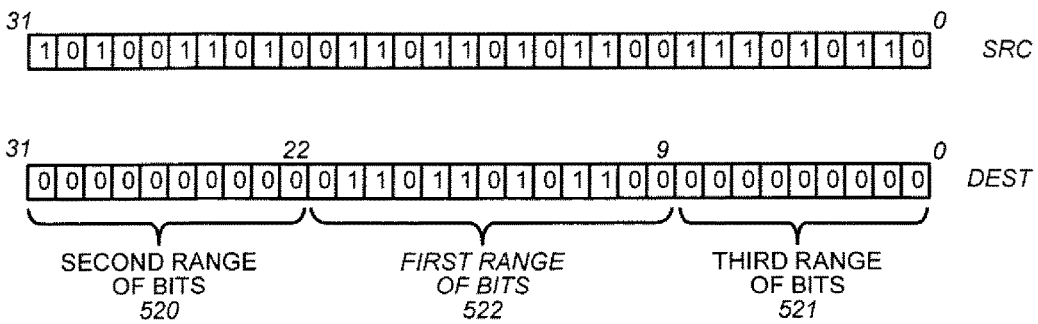
FIG. 5 illustrates a third example embodiment of a bit range isolation operation according to a third example embodiment of a bit range isolation instruction.

FIG. 5 illustrates a third example embodiment of a bit range isolation operation according to a third example embodiment of a bit range isolation instruction that indicates or specifies both ends of a range of bits of interest. For brevity the discussion will tend to focus on the differences relative to the preceding example embodiments without repeating the similarities.

As before, the bit range isolation instruction may indicate or specify a source operand (SRC) and a destination operand (DEST). The destination operand (DEST) has a result including a first range of bits of interest 522, a second range of unwanted bits 520, and an additional third range of unwanted bits 521.

As previously discussed, in the first range of bits 522 each bit is identical in value to a bit of the source operand in a corresponding position. In the second range of bits 520 all of the bits have the same value, which in this particular case is zero. Alternatively, ones may be used instead of zeros.

Likewise, in the third range of bits 521 all of the bits have the same value, which in this particular case is zero. Alternatively, the bit range isolation instruction may zero or otherwise discard the most significant bits of the second range, while not zeroing or discarding the unwanted least significant bits in the third range. These unwanted least significant bits of the third range may subsequently be discarded, if desired, with a subsequent shift right instruction, for example.

The values specifying the ends may each represent a position of a bit as measured from an implicit or otherwise understood point (for example the least significant bit, the most significant bit, or the center bit), or a positive or negative length in bits from an implicit or otherwise understood point (e.g., a least significant bit, a most significant bit, a center bit, or an end of the range of bits of interest). In one particular example embodiment, a first value may represent a bit position of a start of the first range of bits of interest and a second value may represent a length in bits from the starting bit position represented by the first value.

Notice in FIGS. 3-5 that execution of the bit range isolation instruction completes without shifting or otherwise moving the first range of bits of the result relative to the bits of identical value in the corresponding positions of the source operand, regardless of the location of the first range of bits in the result. That is, no shift operation or other operation changing relative bit positions is performed. If it is desired to shift the first range of bits, such as to justify or align the first range of bits with the least significant bit, this may be performed by a subsequent instruction (e.g., a shift right instruction). Many ISAs have a suitable shift right instruction to perform such an operation.

FIGS. 3-5 illustrate several examples of suitable bit range isolation operations and instructions. Still other embodiments will be apparent to those skilled in the art and having the benefit of the present disclosure.

A bit range isolation instruction, according to one particular example embodiment, is a BZHI—Zero High Bits Starting with Specified Bit Position instruction. The BZHI instruction may have a standard 3-byte x86 opcode that may optionally have a REX prefix to address more registers and a wider data space. The instruction operand encoding for the BZHI instruction is shown in Table 1.

TABLE 1

| | Operand 1 | Operand 2 | Operand 3 | Operand 4 |
|---|---|---|---|---|
| A | ModRM:reg (R, W) | ModRM:r/m (R) | NA | NA |

Operand 1 is explicitly specified and may be in the 32-bit general-purpose registers (reg) for the 32-bit mode, or in the 64-bit general-purpose registers for the 64-bit mode. Read (R) and write (W) are allowed for Operand 1.

Operand 2 is explicitly specified and may be in the 32-bit general-purpose registers (r), or memory (m), for the 32-bit mode, or in the 64-bit general-purpose registers, or memory, for the 64-bit mode. Read (R) is allowed for Operand 2.

FIG. 6 shows a description of a BZHI instruction representing a particular example embodiment of a bit range isolation or zeroing instruction. The BZHI instruction copies bits of a second operand into a destination operand and sets to zero all higher order bits starting with a bit position specified by a number contained in the eight lower bits of a first operand up to the maximum of the operand size. For BZHI instruction the first operand is also used as the destination operand and the result overwrites the first operand.

Figure 11:
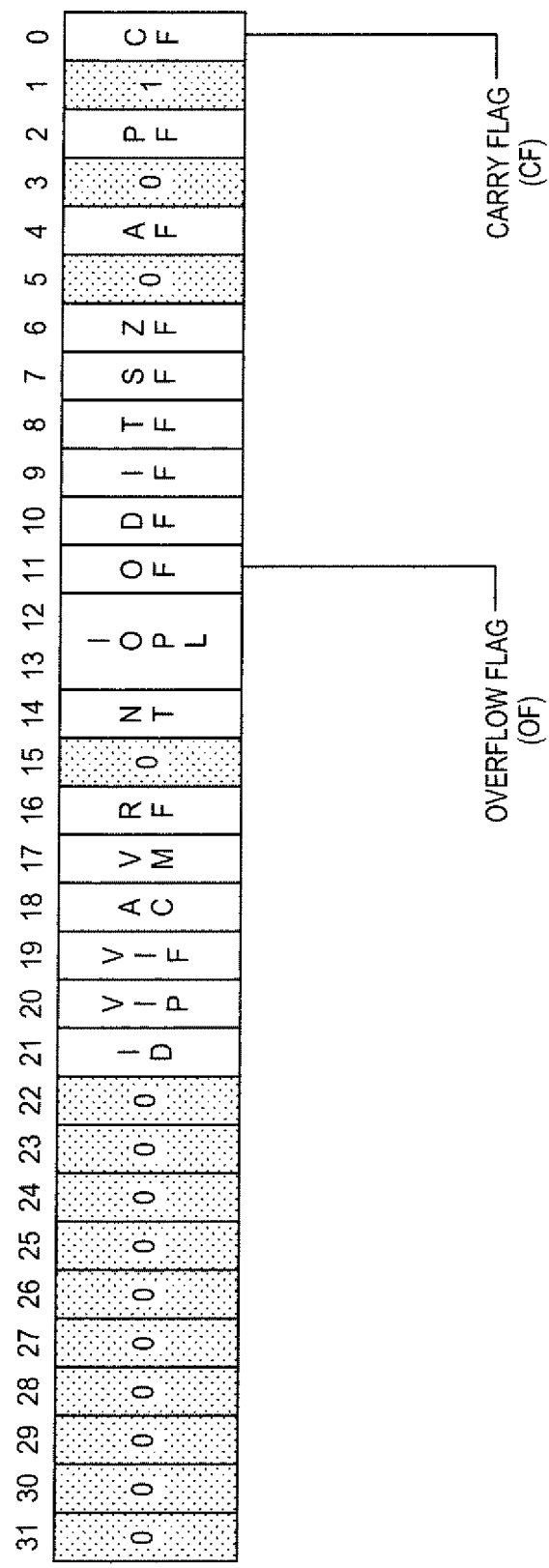
FIG. 11 illustrates an EFLAGS register representing one suitable example embodiment of a status or flags register.

The zero flag (ZF), carry flag (CF), and sign flag (SF) are updated based on the result. The carry flag (CF) is set if the number contained in the eight lower bits of the first operand is greater than the operand size. In one aspect, the bit position in such cases may be taken as the difference between the number contained in the eight lower bits of the first operand and the operand size. The overflow flag (OF) is cleared. The auxiliary carry flag (AF) and parity flag (PF) are undefined. These flags are shown in FIG. 11.

The default operand size is 32-bits. A 64-bit operand size is encodable. A prefix byte of 66H before the instruction will cause #UD.

FIG. 7 shows operation in pseudocode of a BZHI instruction representing a particular example embodiment of a bit range isolation or zeroing instruction. SRC refers to the explicitly specified second source operand having the data, DEST refers to a destination operand that is also used as a first source operand used to store the bit position. OperandSize is 32-bits in 32-bit mode or 64-bits in 64-bit mode. CF refers to the carry flag.

Other instructions are also contemplated. For example, it is not required to overwrite a source operant with a destination operand. Further description of opcodes, encoding, REX, and VEX prefixes, if desired, is available in Intel® 64 and IA-32 Architectures Software Developer's Manual Volume 2A: Instruction Set Reference, A-M, Order Number: 253666-032US, September 2009.

To further illustrate certain concepts, consider how the BZHI has utility in conjunction extracting bit fields. Such extraction of bit fields is useful, for example, in various data decompression compression and decoding algorithms, such as, for example, Huffman, Rice, and Gamma coding, to name just a few examples. Commonly the start and end, or start and length, of the range of bits of interest may be determined during runtime by a decoding algorithm. In some cases, the ranges of bits of interest may have predefined and fixed lengths (e.g., lengths 10:10:10:2). In other cases, the ranges of bits of interest may have variable lengths, such as, for example, in the cases of Huffman, Rice, and Gamma coding. In any event, conventional approaches may be used to determine the start and end, or start and length, of the range of bits of interest.

In some algorithms, BZHI may be used in conjunction with a shift right instruction to isolate and right aligned or justified a bit field of interest with the least significant bit. As one example, when the decoding algorithm calculates the start and end of a range of bits of interest, a BZHI instruction may be performed to zero bits of the data starting with the end and store a result, and then subsequently a shift right instruction may be performed to shift right the result of the BZHI instruction by the start amount and zero extend the most significant bits shifted in. This may be shown as follows:

RESULT1=BZHI DATA, END
RESULT2=SHIFT_RIGHT RESULT1, START

As another example, when the decoding algorithm calculates the start and length of the range of bits of interest, a shift right instruction may be performed to shift right the data, zero extend the most significant bits shifted in, and store a result, and then subsequently a BZHI instruction may be performed on the result of the shift right instruction to zero bits of the result more significant than the length and store a result. This may be shown as follows:

RESULT1=SHIFT_RIGHT DATA, START
RESULT2=BZHI RESULT1, LENGTH

Advantageously, this may eliminate one or more instructions per bit field extract procedure, since there may be no need to compute the lengths if the decoding algorithm provides the starts of the range of bits of interest.

When start and end, or start and length, of a bit range of interest are determined at runtime, the ability to use these values right away and extract a bit field with only two instructions, may provide an advantage. Some ISAs are 2-source instruction set architectures that allow only two operands to be explicitly specified for a single instruction. A universal bit field extract instruction with a variable start and a variable end may need three inputs, namely starting data, a start and one of an end and a length. In some instances the variable start and variable end (or length) of a range of bits may be provided by different calculations and/or known at different times. In a 2-source ISA, the start and either the end or the length may be pre-combined in a single input. However, in some instances pre-combining these inputs may take at least two additional instructions and may tend to increase overall latency. An instruction that may perform a bit range zeroing operation without needing both the variable start and variable end (or length) specified may offer a performance advantage. Accordingly, implicitly specifying a start with the bit range isolation instruction, and omitting the shift operation from the bit range isolation instruction, may each offer a performance advantage.

The isolated and extracted bit fields may be used for various purposes, such as, for example, to put the extracted bit field into the data word size of the machine for further processing, to perform parallel scatter or deposit operations, etc. The scope of embodiments is not limited to any known such processing.

Figure 8:
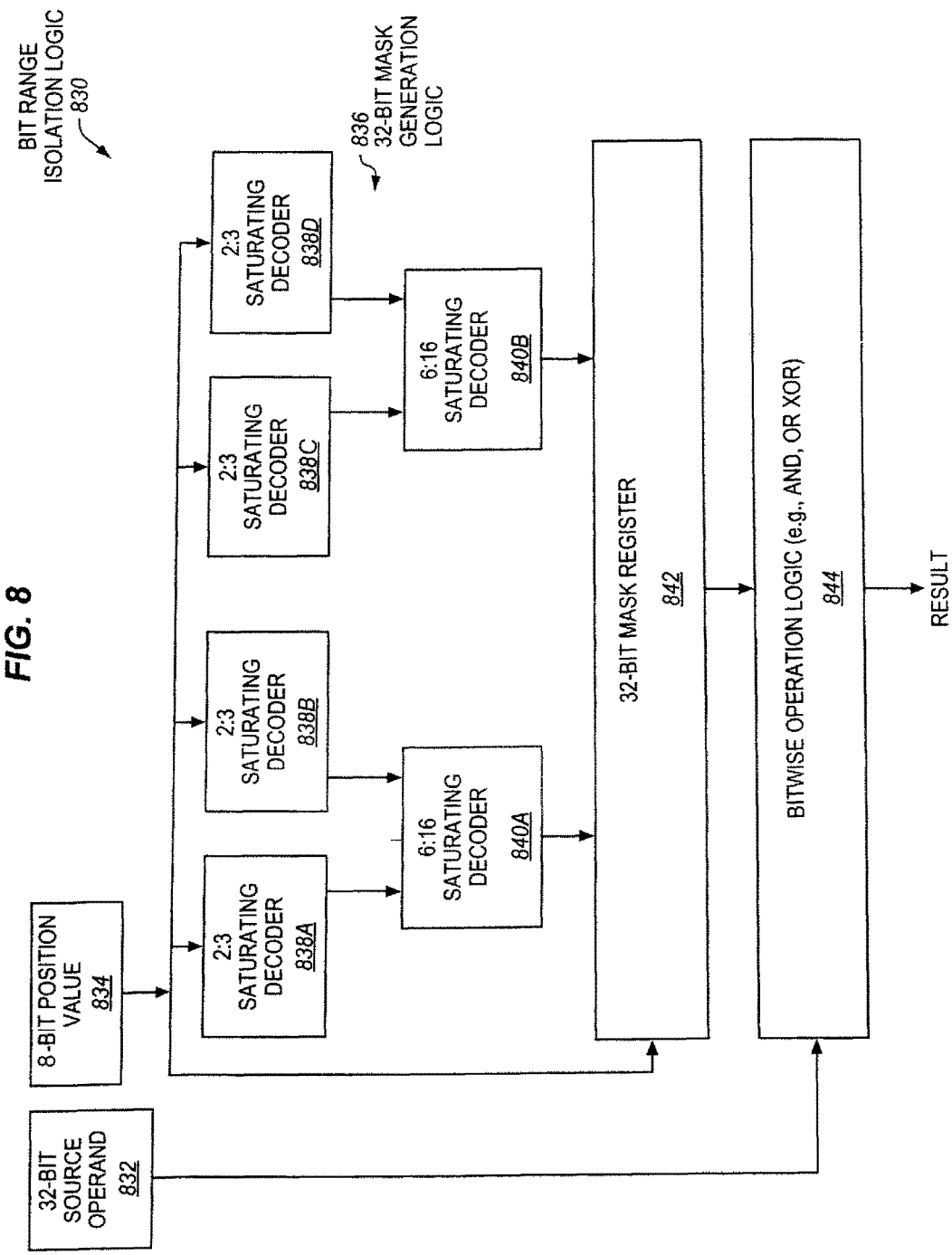
FIG. 8 is a block diagram of an example embodiment of bit range isolation logic.

FIG. 8 is a block diagram of an example embodiment of bit range isolation logic 830. The bit range isolation logic may be included in an execution unit and may be responsive to a bit range isolation instruction.

The illustrated bit range isolation logic is for 32-bit operations. The logic may be readily expanded to perform 64-bit or larger operations. Additionally, the illustrated logic assumes an implicit start for a range of bits of interest at a least significant bit (LSB). Accordingly, the illustrated logic closely resembles the operation shown in FIG. 3.

The bit range isolation logic receives as input a 32-bit source operand 832 and an 8-bit position value 834 that represents a bit position of the other end of the range of bits of interest.

The bit range isolation logic includes mask generation logic 836. The mask generation logic includes four 2:3 saturating decoders 838A-D. Each of the 2:3 saturating decoders are coupled to receive the 8-bit position value. Outputs of a first pair of the saturating decoders 838A-B are coupled with inputs of a first 6:16 saturating decoder 840A. Outputs of a second pair of the saturating decoders 838C-D are coupled with inputs of a second 6:16 saturating decoder 840B. The mask generation logic is operable to generate a mask based on the 8-bit position value. In one embodiment, the mask generation logic may generate a mask that has: (1) a first range of bits that each correspond to a bit in the range of bits of interest in a corresponding position and that each have a value of one; and (2) a second range of bits that each correspond to a bit in the unwanted range of bits not of interest in a corresponding position and that each have a value of zero. For example, the mask may have ones from the implicit least significant bit (LSB) beginning of the range of bits of interest up to the end of the range of bits of interest specified by the 8-bit position value and zeros for all more significant bits.

A 32-bit mask register 842 is coupled with outputs of the first and second 6:16 saturating decoders to receive the mask. By way of example, the 32-bit mask may include a temporary register in logic.

The bit range isolation logic also includes bitwise operation logic 844. In one or more embodiments, the bitwise operation logic may include AND logic. Alternatively, the bitwise operation logic may include OR logic, XOR logic, or the like. The bitwise operation logic is coupled to receive the 32-bit mask from the 32-bit mask register. The bitwise operation logic is also coupled to receive the 32-bit source operand. The bitwise operation logic is operable to perform the bitwise operation on the 32-bit source operand and the 32-bit mask.

In the case of AND operation logic, the bits of the 32-bit source operand which are masked by ones in the mask may be reproduced identically in the result, whereas the bits of the 32-bit source operand which are masked by zeros in the mask may all be cleared or set to zero. Such AND operation logic may be regarded as zero logic.

In the case of OR operation logic, the bits of the 32-bit source operand which are masked by ones in the mask may be reproduced identically in the result, whereas the bits of the 32-bit source operand which are masked by zeros in the mask may all be set to ones. Often it is more useful to clear the unwanted bits to zeros with AND operation logic instead of setting them to ones with OR operation logic, although there are instances where the OR operation logic offers an advantage.

A slight variation of the illustrated bit range isolation logic 830 may allow an explicit flexible start position rather than an implicit least significant bit (LSB) start. Optionally, the decoders 838A-D and the decoders 840A-B may not be saturating decoders, and the explicit start position may be added as an additional input into the non-saturating decoders. This may allow a bit range isolation operation that closely resembles that shown in FIG. 5.

In one or more embodiments, registers of a general-purpose register set may be used to store one or more source and/or destination operands. To further illustrate certain concepts, example embodiments of suitable general-purpose registers available in various Intel architecture processors will be discussed, although these particular registers certainly are not required.

FIG. 9 illustrates one particular example embodiment of a suitable 32-bit general-purpose register set 950. The 32-bit register set includes eight 32-bit or doubleword general-purpose registers. These registers are referred to as EAX, EBX, ECX, EDX, ESI, EDI, EBP, and ESP. These 32-bit registers are also addressable in 16-bit and 8-bit modes. The lower 16 bits of the EAX, EBX, ECX, and EDX registers are referred to as AX, BX, CX, and DX, respectively. By way of example, word unsigned integers having 16-bits may be stored in the registers BX, CX, and DX, respectively. Doubleword unsigned integers having 32-bits may be stored in the registers EAX, EBX, ECX, EDX, ESI, EDI, EBP, ESP, R8D-R15D.

FIG. 10 illustrates another particular example embodiment of a suitable 64-bit general-purpose register set 1052.

The 64-bit register set includes sixteen 64-bit or quadword general-purpose registers. These registers are referred to as RAX, RBX, RCX, RDX, RSI, RDI, RBP, RSP, R8, R9, R10, R11, R12, R13, R14, and R15. These registers are operable in 32-bit mode on 32-bit operands, and operable in 64-bit mode on 64-bit operands. The lower 32-bits of the RAX, RBX, RCX, RDX, RSI, RDI, RBP, and RSP registers respectively correspond to the EAX, EBX, ECX, EDX, ESI, EDI, EBP, and ESP registers. The lower 32-bits of the registers R8-R15 are also addressable in 32-bit mode and are referred to by R8D-R15D. By way of example, quadword unsigned integers having 64-bits may be stored in the registers RAX, RBX, RCX, RDX, RSI, RDI, RBP, RSP, or R8-R15.

Additional description of the general purpose registers, if desired, is available in Intel® 64 and IA-32 Architectures Software Developer's Manual, Volume 1: Basic Architecture, Order Number: 253665-032US, September 2009. These particular registers are examples only, and are not required.

FIG. 11 illustrates an EFLAGS register representing one suitable example embodiment of a status or flags register. This particular register and these particular flags are not required.

The EFLAGS register is a 32-bit register that includes a group of status flags, a control flag, and a group of system flags. The status flags include a carry flag (CF, bit 0), a parity flag (PF, bit 2), an auxiliary carry flag (AF, bit 4), a zero flag (ZF, bit 6), a sign flag (SF, bit 7), and an overflow flag (OF, bit 11).

The system flags include a trap flag (TF, bit 8), an interrupt enable flag (IF, bit 9), an I/O privileged level (IOPL, bits 12-13), a nested task (NT, bit 14), a resume flag (RF, bit 16), a virtual-8086 mode (VM, bit 17), an alignment check (AC, bit 18), a virtual interrupt flag (VIF, bit 19), a virtual interrupt pending (VIP, bit 20), and an ID flag (ID, bit 21). The control flag includes a direction flag (DF, bit 10). Bits 22-31 of EFLAGS are reserved.

The EFLAGS register is the successor to an earlier 16-bit FLAGS register. Additionally, the EFLAGS register, in 64-bit mode processors, has been succeeded and extended to 64-bits by an RFLAGS register. The lower 32-bits of RFLAGS is the same as EFLAGS. In each of the FLAGS, EFLAGS, and RFLAGS registers, the carry flag (CF) is bit 0. Additional description of the EFLAGS/RFLAGS registers, and the carry flag, if desired, is available in Intel® 64 and IA-32 Architectures Software Developer's Manual, Volume 1: Basic Architecture, Order Number: 253665-032US, September 2009.

One or more embodiments include an article of manufacture that includes a tangible machine-accessible and/or machine-readable medium having stored thereon a bit range isolation instruction that if executed by a machine (e.g., an execution unit) causes a bit range isolation operation as described elsewhere herein. The tangible medium may include one or more solid materials. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

Suitable machines include, but are not limited to, execution units, general-purpose processors, special-purpose processors (e.g., graphics processors and cryptographic processors), cryptographic accelerators, network communications processors, computer systems, network devices, modems, personal digital assistants (PDAs), cellular phones, and a wide variety of other electronic devices with one or more execution units, to name just a few examples.

Still other embodiments pertain to a computer system, embedded system, or other electronic device having an execution unit and/or performing a method as disclosed herein.

Figure 12:
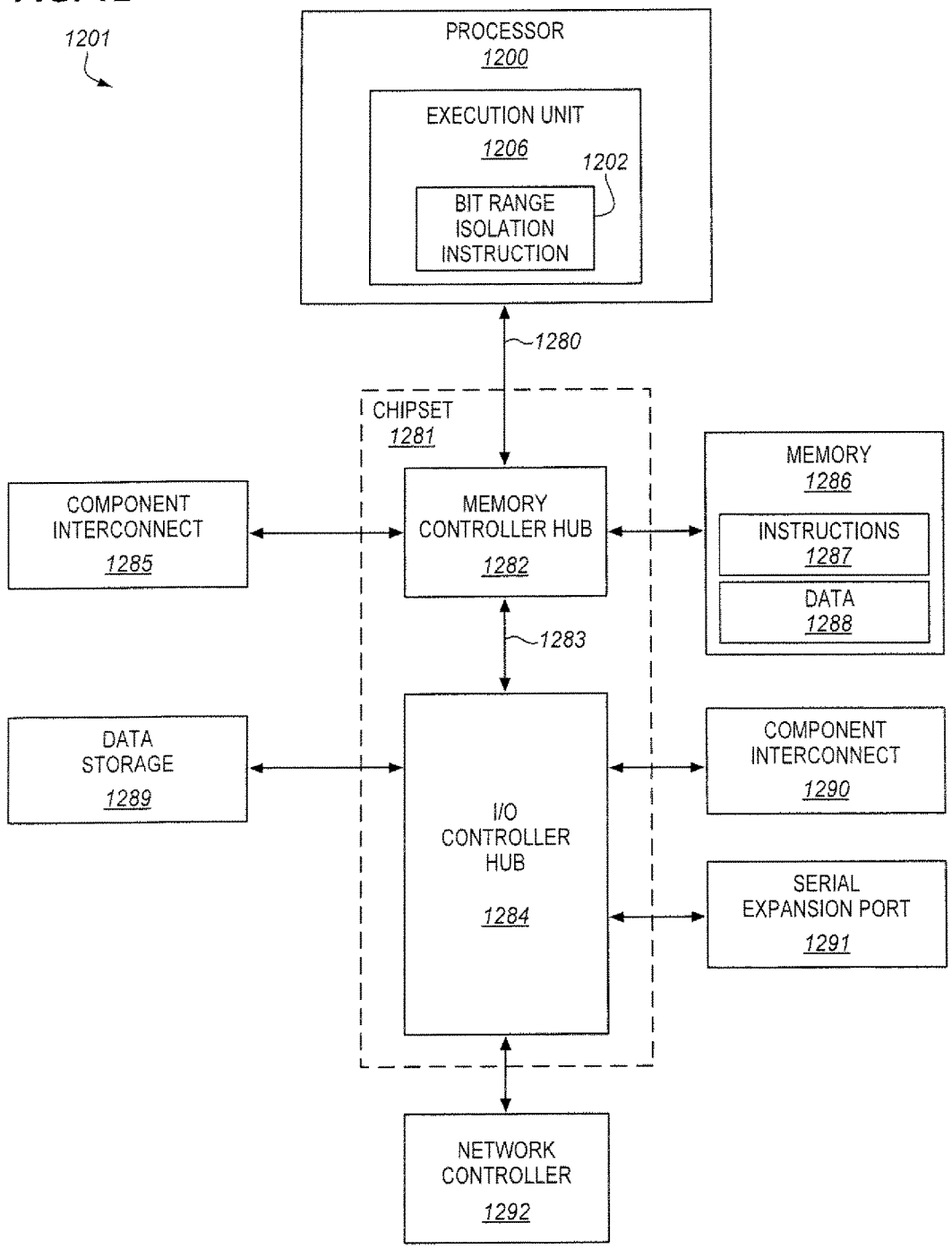
FIG. 12 is a block diagram of a first example embodiment of a suitable computer system.

FIG. 12 is a block diagram of a first example embodiment of a suitable computer system 1201.

The computer system includes a processor 1200. The processor includes at least one execution unit 1206 that is capable of executing at least one bit range isolation instruction 1202.

The processor is coupled to a chipset 1281 via a bus (e.g., a front side bus) or other interconnect 1280. The interconnect may be used to transmit data signals between the processor and other components in the system via the chipset.

The chipset includes a system logic chip known as a memory controller hub (MCH) 1282. The MCH is coupled to the front side bus or other interconnect 1280.

A memory 1286 is coupled to the MCH. In various embodiments, the memory may include a random access memory (RAM). DRAM is an example of a type of RAM used in some but not all computer systems. As shown, the memory may be used to store instructions 1287, such as one or more bit range isolation instructions, and data 1288.

A component interconnect 1285 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 1284. The ICH is coupled to the MCH through hub interface bus or other interconnect 1283. In one or more embodiments, the bus or other interconnect 1283 may include a Direct Media Interface (DMI).

A data storage 1289 is coupled to the ICH. In various embodiments, the data storage may include a hard disk drive, a floppy disk drive, a CD-ROM device, a flash memory device, or the like, or a combination thereof.

A second component interconnect 1290 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 1291 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 1282 may be physically integrated on-die with the processor 1200 and the processor may be directly coupled with a memory 1286 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 13:
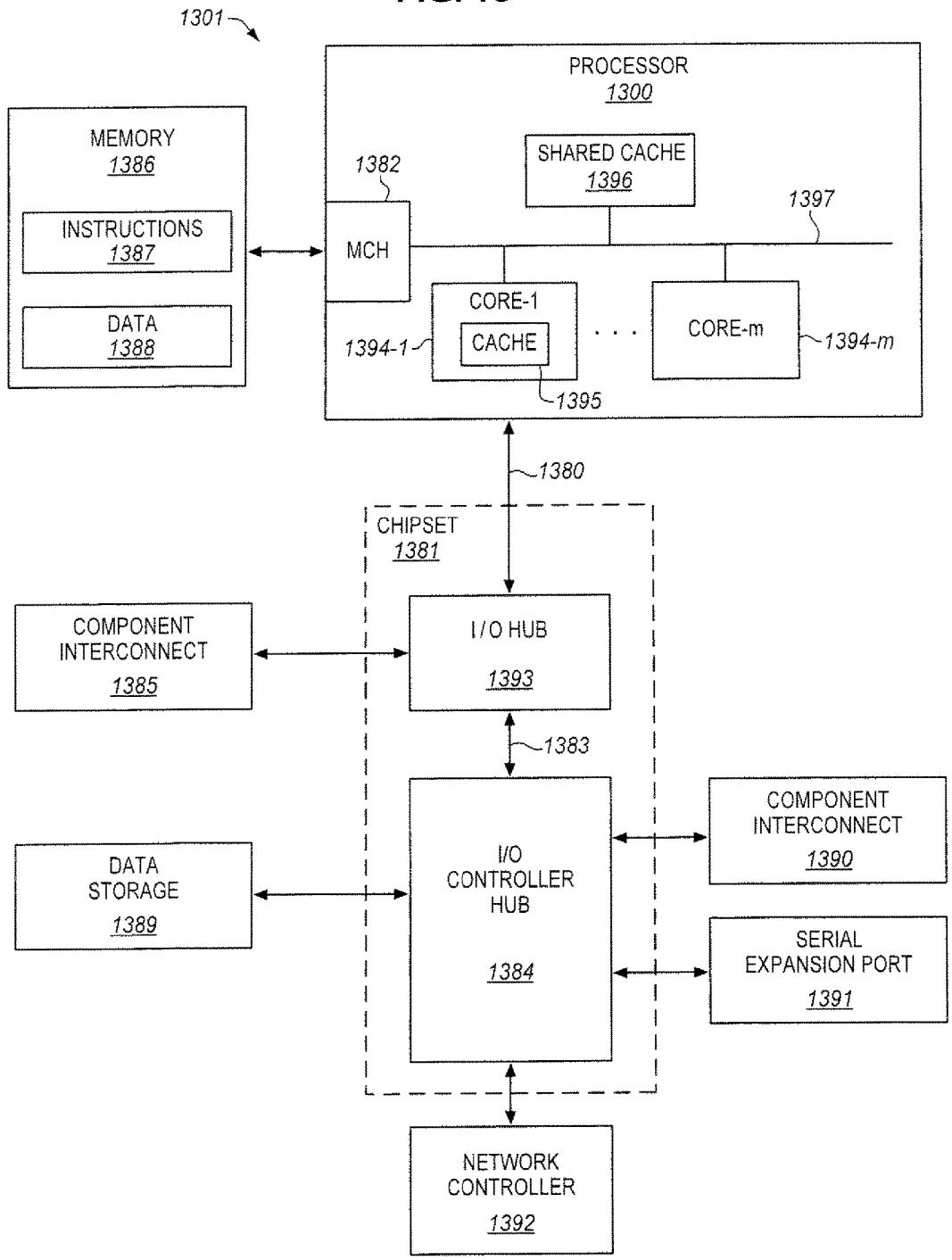
FIG. 13 is a block diagram of a second example embodiment of a suitable computer system.

FIG. 13 is a block diagram of a second example embodiment of a suitable computer system 1301. The second example embodiment has certain similarities to the first example computer system described immediate above. For clarity, the discussion will tend to emphasize the differences without repeating all of the similarities.

Similar to the first example embodiment described above, the computer system includes a processor 1300, and a chipset 1381 having an I/O controller hub (ICH) 1384. Also similarly to the first example embodiment, the computer system includes a first component interconnect 1385 coupled with the chipset, a second component interconnect 1390 coupled with the ICH, a serial expansion port 1391 coupled with the ICH, a network controller 1392 coupled with the ICH, and a data storage 1389 coupled with the ICH.

In this second embodiment, the processor 1300 is a multi-core processor. The multi-core processor includes processor cores 1394-1 through 1394-M, where M may be an integer number equal to or larger than two (e.g. two, four, seven, or more). Each core may include at least one execution unit that is capable of executing at least one embodiment of an instruction as disclosed herein. As shown, the core-1 includes a cache 1395 (e.g., an L1 cache). Each of the other cores may similarly include a dedicated cache. The processor cores may be implemented on a single integrated circuit (IC) chip.

The processor also includes at least one shared cache 1396. The shared cache may store data (e.g., instructions) that are utilized by one or more components of the processor, such as the cores. For example, the shared cache may locally cache data stored in a memory 1386 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 1397. The bus or other interconnect may couple the cores and the shared cache and allow communication.

The processor also includes a memory controller hub (MCH) 1382. As shown in this example embodiment, the MCH is integrated with the processor 1300. For example, the MCH may be on-die with the processor cores. The processor is coupled with the memory 1386 through the MCH. In one or more embodiments, the memory may include DRAM, although this is not required.

The chipset includes an input/output (I/O) hub 1393. The I/O hub is coupled with the processor through a bus (e.g., a QuickPath Interconnect (QPI)) or other interconnect 1380. The first component interconnect 1385 is coupled with the I/O hub 1393.

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the scope but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to a machine instruction or one or more control signals derived from the machine instruction to store an instruction specified result operand.

It should also be appreciated that reference throughout this specification to "one embodiment", "an embodiment", or "one or more embodiments", for example, means that a particular feature may be included in the practice of embodiments. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that embodiments require more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A hand held device comprising:
a dynamic random access memory;
a memory controller coupled to the dynamic random access memory;
a flash memory device to store data;
a wireless transceiver;
a user input device;
a network controller to couple the hand held device to a network;
a shared cache to store data; and
a plurality of processor cores coupled to the memory controller and the shared cache, at least one of the plurality of processor cores comprising:
an L1 cache;
an instruction fetch logic;
branch prediction logic;
a plurality of registers including control registers, status registers, and 64-bit general purpose registers, wherein a lower 32-bits of the 64-bit general purpose registers are addressable to operate on 32-bit operands, and wherein the status registers include a 32-bit register that is to have a plurality of bits associated with a group of status flags, the status flags to include a carry flag, a zero flag, a sign flag, and an overflow flag;
an instruction decoder to receive and decode a bit range isolation instruction, the instruction to implicitly indicate a first end of a range of bits of interest, and, through an immediate associated with the instruction, to explicitly specify as a bit position a second end of the range of bits of interest; and
an execution unit to perform a bit range isolation operation on a source operand of the bit range isolation instruction, the source operand to be stored in one of the 64-bit general purpose registers, an encoding of the bit range isolation instruction to indicate one of a plurality of source operand sizes, including a 32-bit operand size and a 64-bit operand size, the execution unit comprising:
mask generation logic to generate a mask; and
bitwise operation logic to receive the source operand and the mask, and to perform a bitwise operation on the source operand and the mask to produce a result that is to include a first range of bits in which each bit is to be identical in value to a bit of the source operand in a corresponding position, and a second range of bits more significant than the first range that are all to have a same value regardless of bit values in corresponding positions of the source operand,
wherein it is implicit to the bit range isolation instruction that the first range of bits of the result is not moved in bit position relative to the bits of the identical values of the source operand,
wherein it is implicit to the bit range isolation instruction that the second range of bits are all to have the same value, and
wherein the instruction allows the same value to be binary one.

2. The hand held device of claim 1, wherein the at least one of the plurality of processor cores further comprises register renaming logic, scheduling logic, a re-order buffer, and retirement logic.

3. The hand held device of claim 1, wherein the mask is to include a first range of bits that are each to correspond to a bit in the first range of bits of interest in a corresponding position and each to have a first binary value, and a second range of bits that are each to correspond to a bit in a range of bits not of interest in a corresponding position and that are each to have a second different binary value.

4. The hand held device of claim 1, wherein execution of the bit range isolation instruction is to complete without shifting the first range of bits of the result.

5. The hand held device of claim 1, further comprising a USB port to couple the hand held device to input/output devices.

6. The hand held device of claim 1, wherein the instruction does not explicitly specify a start bit position where a start of the first range of bits is to be stored in the result.

7. A hand held device comprising:
a dynamic random access memory;
a memory controller coupled to the dynamic random access memory;
a flash memory device to store data;
a wireless transceiver;
a user input device;
a network controller to couple the hand held device to a network;
a shared cache to store data; and
a plurality of processor cores coupled to the memory controller and the shared cache, at least one of the plurality of processor cores comprising:
an L1 cache;
an instruction fetch logic;
branch prediction logic;
a plurality of registers including control registers, status registers, and 64-bit general purpose registers, wherein a lower 32-bits of the 64-bit general purpose registers are addressable to operate on 32-bit operands, and wherein the status registers include a 32-bit register that is to have a plurality of bits associated with a group of status flags, the status flags to include a carry flag, a zero flag, a sign flag, and an overflow flag;
an instruction decoder to receive and decode a bit range isolation instruction, the instruction to inflexibly indicate a first end of a range of bits of interest, and, through an immediate associated with the instruction, to explicitly specify as a bit position a second end of the range of bits of interest; and
an execution unit to perform a bit range isolation operation on a source operand of the bit range isolation instruction, the source operand to be stored in one of the 64-bit general purpose registers, an encoding of the bit range isolation instruction to indicate one of a plurality of source operand sizes, including a 32-bit operand size and a 64-bit operand size, the execution unit comprising:
mask generation logic to generate a mask; and
bitwise operation logic to receive the source operand and the mask, and to perform a bitwise operation on the source operand and the mask to produce a result that is to include a first range of bits in which each bit is to be identical in value to a bit of the source operand in a corresponding position, and a second range of bits more significant than the first range that are all to have a same value regardless of bit values in corresponding positions of the source operand,
wherein the bit range isolation instruction does not explicitly specify a start bit position where a start of the first range of bits is to be stored in the result.

8. The hand held device of claim 7, wherein the mask is to include a first range of bits that are each to correspond to a bit in the first range of bits of interest in a corresponding position and each to have a value of one, and a second range of bits that are each to correspond to a bit in a range of bits not of interest in a corresponding position and that are each to have a value of zero.

9. The hand held device of claim 7, wherein execution of the bit range isolation instruction is to complete without shifting the first range of bits of the result.

10. The hand held device of claim 7, wherein the same value is a bit value of zero.

11. The hand held device of claim 7, wherein the at least one of the plurality of processor cores further comprises register renaming logic, scheduling logic, a re-order buffer, and retirement logic.

12. The hand held device of claim 7, further comprising a USB port to couple the hand held device to input/output devices.

13. The hand held device of claim 7, wherein the instruction is to inflexibly indicate that the first range of bits of the result is to be stored starting at a least significant bit of the result.

14. A hand held device comprising:
a dynamic random access memory;
a memory controller coupled to the dynamic random access memory;
a flash memory device to store data;
a wireless transceiver;
a user input device;
a network controller to couple the hand held device to a network;
a shared cache to store data; and
a plurality of processor cores coupled to the memory controller and the shared cache, at least one of the plurality of processor cores comprising:
an L1 cache;
an instruction fetch logic;
branch prediction logic;
a plurality of registers including control registers, status registers, and 64-bit general purpose registers, wherein a lower 32-bits of the 64-bit general purpose registers are addressable to operate on 32-bit operands, and wherein the status registers include a 32-bit register that is to have a plurality of bits associated with a group of status flags, the status flags to include a carry flag, a zero flag, a sign flag, and an overflow flag;
an instruction decoder to receive and decode a bit range isolation instruction, the instruction to require a particular first end of a range of bits of interest, and, through an immediate associated with the instruction, to explicitly specify as a bit position a second end of the range of bits of interest; and
an execution unit to perform a bit range isolation operation on a source operand of the bit range isolation instruction, the source operand to be stored in one of the 64-bit general purpose registers, an encoding of the bit range isolation instruction to indicate one of a plurality of source operand sizes, including a 32-bit operand size and a 64-bit operand size, the execution unit comprising:
mask generation logic to generate a mask; and
bitwise operation logic to receive the source operand and the mask, and to perform a bitwise AND operation on the source operand and the mask to produce a result that is to include a first range of bits in which each bit is to be identical in value to a bit of the source operand in a corresponding position, and a second range of bits more significant than the first range that are all to have a same value regardless of bit values in corresponding positions of the source operand,
wherein the instruction requires that the first range of bits of the result is to be stored starting at a least significant bit of the result, and
wherein execution of the bit range isolation instruction is to complete without shifting the first range of bits of the result.

15. The hand held device of claim 14, wherein the mask is to include a first range of bits that are each to correspond to a bit in the first range of bits of interest in a corresponding position and each to have a value of one, and a second range of bits that are each to correspond to a bit in a range of bits not of interest in a corresponding position and that are each to have a value of zero.

16. The hand held device of claim 14, wherein the same value is a bit value of zero.

17. The hand held device of claim 14, wherein the same value is a bit value of zero, and wherein the mask is to include bits that are to correspond to one of the bits of the second range of bits of the result which are all to have a value of zero.

18. The hand held device of claim 7, wherein the same value is allowed to be binary one.

19. The hand held device of claim 14, wherein the same value can be binary one for the instruction.

* * * * *